United States Patent [19]

Dargies

[11] Patent Number: 5,456,065
[45] Date of Patent: Oct. 10, 1995

[54] INJECTION ELEMENT OF COAXIAL DESIGN FOR ROCKET COMBUSTION CHAMBERS

[75] Inventor: Eckhard Dargies, Möckmühl, Germany

[73] Assignee: Daimler-Benz Aerospace AG, Munich, Germany

[21] Appl. No.: 193,943

[22] Filed: Feb. 9, 1994

[30] Foreign Application Priority Data

Feb. 19, 1993 [DE] Germany .......................... 43 05 154.5

[51] Int. Cl.$^6$ ..................................................... F02K 9/52
[52] U.S. Cl. ............................. 60/258; 239/403; 239/424
[58] Field of Search ...................... 60/257, 258, 39.461; 239/403, 424

[56] References Cited

U.S. PATENT DOCUMENTS

| | | |
|---|---|---|
| 2,874,539 | 2/1959 | Fox . |
| 3,464,633 | 9/1969 | Potocnik .................................. 60/258 |
| 3,468,487 | 9/1969 | Warren . |

FOREIGN PATENT DOCUMENTS 3424225  5/1987  Germany .
3818623  7/1989  Germany .

*Primary Examiner*—Richard A. Bertsch
*Assistant Examiner*—William Wicker
*Attorney, Agent, or Firm*—McGlew and Tuttle

[57] ABSTRACT

Injection element of coaxial design for rocket combustion chambers with a combustion chamber pressure of 3 to 30 bar and for operation with two hypergolically reacting propellants, with a central body for the oxidant, whose flow channel has a twisting insert, a cross section contraction and a sharp opening edge, and with a sleeve concentrically surrounding the central body to limit an annular flow channel for the propellant, wherein the flow channel has a circular cylindrical outlet with a sharp opening edge. The flow channel of the central body has a circular cylindrical outlet. The opening edges of the central body and of the sleeve are located approximately in the plane of the front surface of the combustion chamber. A flow divider, which divides the propellant flow into five to twenty equal individual flows is arranged in the flow channel for the propellant. The velocities of flow of the oxidant and of the propellant are between 5 m/sec and 20 m/sec at the point of entry into the combustion chamber.

11 Claims, 2 Drawing Sheets

INJECTION ELEMENT OF COAXIAL DESIGN FOR ROCKET COMBUSTION CHAMBERS

FIELD OF THE INVENTION

The present invention pertains to an injection element of coaxial design for rocket combustion chambers with a combustion chamber pressure of 3 to 30 bar and for operation with two hypergolically reacting propellants, wherein nitrogen tetroxide, mixtures of nitrogen tetroxide and dinitrogen tetroxide (MON, Mixed Oxygen Nitride), or nitric acid is preferably used as the oxidant, and hydrazine and/or its derivatives are preferably used as the fuel.

BACKGROUND OF THE INVENTION

The application of the principle of the coaxial injection of two liquid propellant components for hypergolic and non-hypergolic propellants has been known from U.S. Pat. No. 2,874,539. However, the simple, highly schematic representation is unable to provide the person skilled in the art with specific information for the design embodiment of the injection head or the injection elements. Especially hypergolic propellants must be absolutely separated from one another prior to entry into the intended reaction zone in order to avoid unintended reactions with possibly catastrophic consequences. Such safety aspects have not been taken into account in the design according to the prior art U.S. patent, either.

German Patent No. DE-PS 34 24 225 discloses injection elements for non-hypergolic propellants (e.g., $H_2O_2$, $CH_4$/$O_2$), which have proved to be highly successful especially in the design according to FIGS. 1 and 2. According to the coaxial principle, each injection element consists of a central body for the oxidant and of a two-part, screwed-on sleeve for the propellant, which sleeve is concentric to the central body and axially projects beyond the outlet of the central body. The outlet of the central body is conically expanded, has a sharp opening edge and twisting surfaces in the conical area. The sleeve has radial inlet holes and an essentially cylindrical, central channel, which surrounds the outlet of the central body. The known advantages of this coaxial arrangement are as follows:

a) Engines of different thrust classes can be manufactured with a standard injection element by varying the number of elements.

b) Low thermal load on the injection head front plate, and consequently long service life.

c) Low injection pressure drop, and consequently low tank or delivery pressure (gas pressure or pump pressure).

The mixture formation and combustion take place essentially consecutively in the case of non-hypergolic operation. The mixing of the usually gaseous propellant with the liquid oxidant is facilitated by an essentially higher velocity of admission of the propellant (velocity ratio, e.g., 15:1).

In the case of hypergolic propellants, the two components meet one another in the liquid form after the injection and react spontaneously with one another on contact. It is therefore important to provide for the largest possible reacting surfaces, i.e., to adequately prepare the two components separately from one another, and then to unite them without great differences in velocity.

An injection element of coaxial design for rocket combustion chambers with a combustion chamber pressure of 5 to 25 bar and for operation with two hypergolically reacting propellants has been known from German Patent No. DE-PS 38 18 623; the central body of this injection element for the oxidant has a twisting body as well as a conically expanding outlet with a sharp opening edge. The central body is surrounded in the outlet area by a concentric sleeve for adding the fuel, and this sleeve axially projects beyond the central body toward the combustion chamber to form a pre-reaction space. Specific limit values are mentioned for the geometry of the pre-reaction space as well as for the velocity ratios in its area. Practical experiments have unfortunately shown that this design tends to generate vibrations of the combustion chamber. This is explained by periodic microexplosions in the area of the pre-reaction space, which briefly interrupt the flow of propellant. Aside from the loss of power caused by this, the variations in pressure thus generated may destroy the engine structure in the worst case.

SUMMARY AND OBJECTS OF THE INVENTION

The object of the present invention is consequently to provide an injection element of coaxial design for operation with two hypergolically reacting propellants, which makes possible stable combustion without relevant variations in pressure.

According to the invention, an injection element of coaxial design is provided for a rocket combustion chamber with a combustion chamber pressure of 3 to 30 bar and for operation with two hypergolically reacting propellants. Nitrogen tetroxide, mixtures of nitrogen tetroxide and dinitrogen tetroxide (MON, Mixed Oxygen Nitride), or nitric acid is preferably used as the oxidant, and hydrazine and/or its derivatives are preferably used as the fuel. The injection element includes an at least extensively rotationally symmetrically central body for the oxidant. The central body includes a flow channel with a twisting insert and with a cross sectional contraction leading to an outlet with a sharp opening edge. A sleeve is provided concentrically surrounding the central body and delimiting an annular flow channel for the fuel. The annular flow channel has lateral inlet openings and an outlet with a circular cylindrical inner contour with a propellant opening to the combustion chamber having a sharp opening edge. The oxidant flow channel has a circular cylindrical internal contour at least in an area of the outlet opening. The oxidant opening edge and the propellant opening edge are both located in a plane of a front surface of the combustion chamber. A flow divider is provided for dividing the fuel flow into 5 to 20 individual flow portions of equal flow rate and cross section at equally spaced locations. The flow divider is arranged in the fuel flow channel between the sleeve forming a fuel opening and the central body. The flow cross sections are dimensioned such that the velocities of flow of the oxidant and the fuel are between 5 m/sec and 20 m/sec at a point of entry into the combustion chamber.

The flow divider according to the invention extends radially from the central body to a location adjacent to an internal contour of the sleeve. The flow divider has from 5 to 20 radially and axially oriented slots, which are open toward the sleeve and have a constant width over their radial depth and their axial length. The ratio of the radial depth to the width is from 1 to 5. Preferably, a radial gap is present between the internal contour of the sleeve and the external circumference of the flow divider. The radial gap is at most 10 µm, which is constant over the circumference and over the axial length of the flow divider. The downstream end of the flow divider is preferably axially spaced from the opening edge of the sleeve. The flow channel in the central body from the twisting insert to the opening edge is designed such that the oxidant exits from central body in the form of a plurality of individual drops with a solid or hollow conical distribution. The opening angle is preferably at least 20° and at most 90°.

The central body and the sleeve open approximately in the plane of the front surface of the combustion chamber, so that there is no pre-reaction space any longer. The fuel flow is divided into five to twenty equal individual flows by means of a flow divider. The geometry of the oxidant flow channel (twist insert, etc.) brings about a conical expansion of the oxidant flow in the area of the opening, as a result of which a rapid, reliable mixing with the propellant flows is achieved. This leads to a highly stable, complete combustion, which is ultimately what makes possible the successful application of the coaxial principal to hypergolic propellant components.

The requirement is a combustion chamber pressure of 3 to 30 bar. Preferred propellants are hydrazine ($N_2H_4$) and its derivatives (e.g., monomethylhydrazine or MMH and asymmetric dimethylhydrazine); preferred oxidants are nitrogen tetroxide ($N_2O_4$), "MON" (Mixed Oxygen Nitride, $N_2O_4$ +NO), or nitric acid ($HNO_3$).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
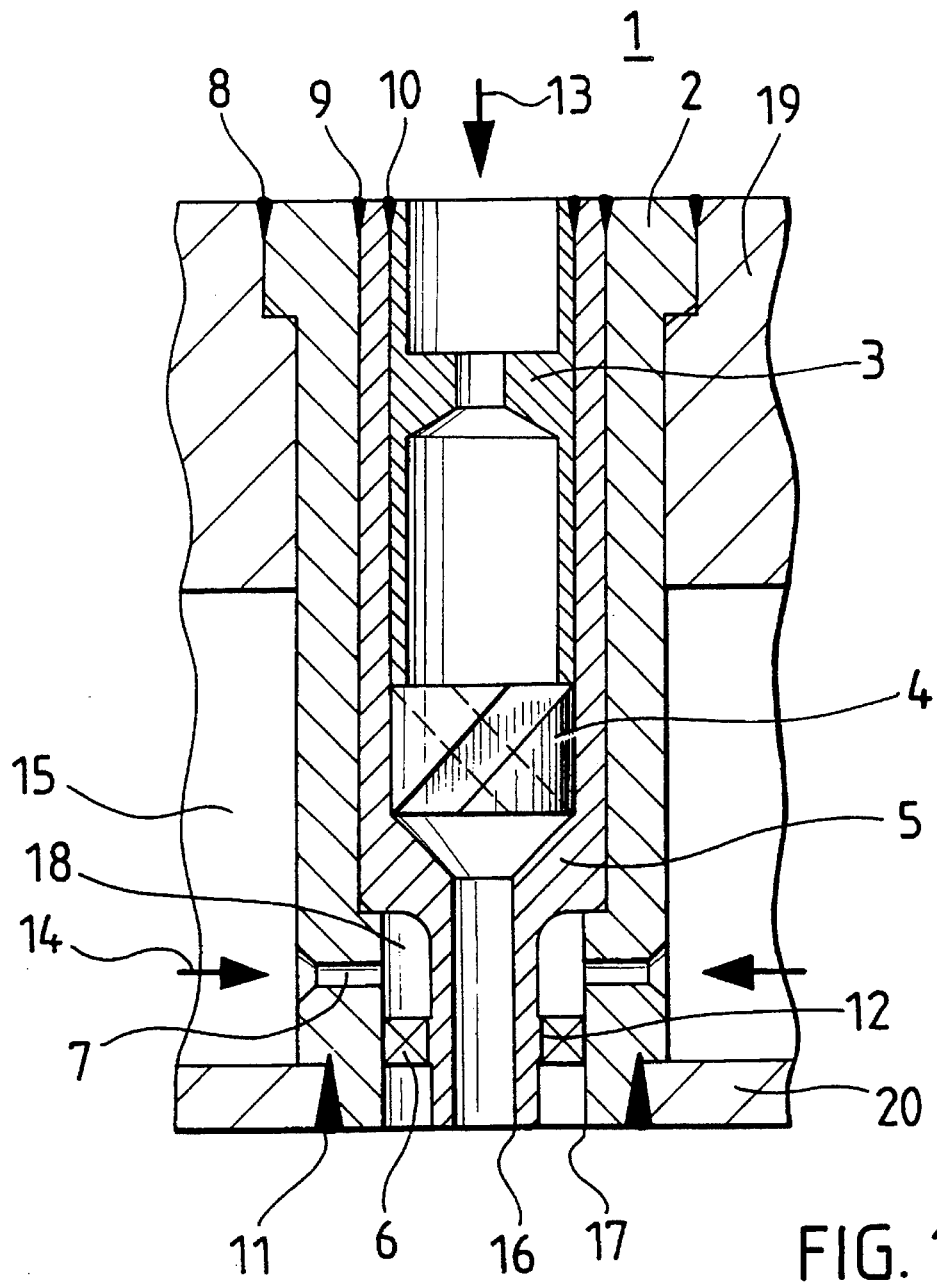
FIG. 1 is a partial longitudinal sectional view through an injection head of a rocket combustion chamber in the area of an injection element.
Figure 2:
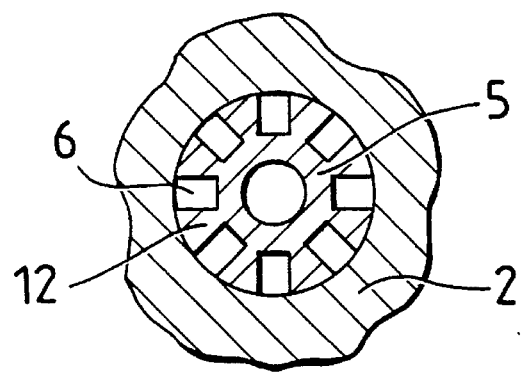
FIG. 2 is a cross section through the injection element in the area of the flow divider.
Figure 3:
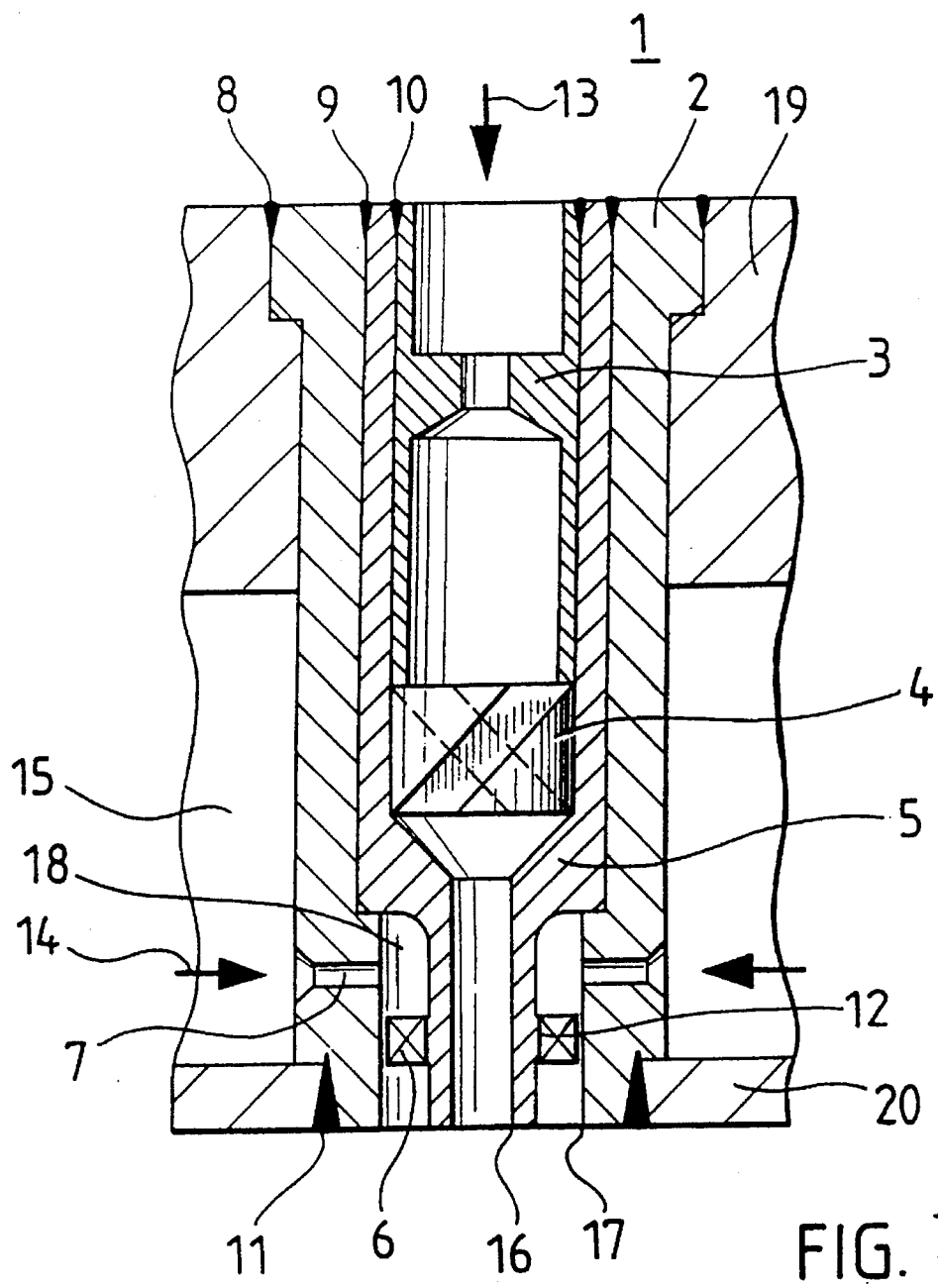
FIG. 3 is a partial longitudinal sectional view through an alternate embodiment of an injector head of a rocket combustion chamber in the area of an injection element.
Figure 4:
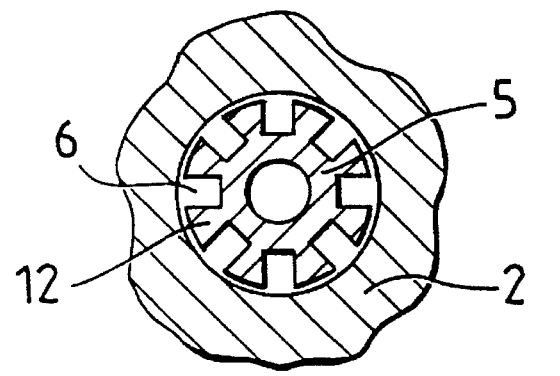
FIG. 4 is a cross section through the injection element of FIG. 3, in the area of the flow divider.

The injection element 1 is part of the injection head of a rocket engine, wherein several hundred of such the injection elements 1 may be arranged in the head, depending on the size of the engine. Every individual element consists of two main parts, namely, the central body 5 and the sleeve 2.

The central body 5 contains on the inside the oxidant flow channel, which is divided into a plurality of sections with different functions. On its outside, it carries the geometric structure limiting the flow cross section of the fuel. The oxidant 13 flows from a distribution space arranged above the elements via the throttle 3 and into the oxidant flow channel. The throttle is used to set the desired injection pressure drop, which is needed for uncoupling the vibrations between the combustion chamber and the delivery system. The throttle 3 is also used to fix the twisting insert 4 arranged downstream of it. The throttle 3 is connected to the central body 5 via the weld seam 10. A rotary movement, which is necessary for the preparation of the oxidant, is superimposed to the axial flow movement of the liquid oxidant by the twisting insert 4 arranged below the throttle 3. Via the cross section contraction arranged downstream of the twisting insert, the oxidant reaches the cylindrical outlet, and its sharp-edged opening 16 forms the inlet into the combustion chamber. Due to the twist still present in the opening 16, the jet of liquid oxidant expands directly after the inlet into the combustion chamber and disintegrates into individual drops. The angle of the oxidant spray cone formed and the hollow conical or solid conical distribution of the oxidant over the cone cross section depend on the shape of the twisting insert 4 and the geometry of the oxidant flow channel.

The fuel flow channel is formed by the sleeve 2 concentrically surrounding the central body 5 in conjunction with the slots 6 arranged on the circumference of the central body 5. The propellant 14 flows from the distribution space 15 via the radial throttle openings 7 and into the annular gap 18. The fuel subsequently flows through the axially arranged slots 6 of the flow divider 12 made in one piece with the central body 5, as a result of which it is divided into a plurality of individual jets of rectangular cross section.

Downstream of the rectangular slots, the jets of propellant either flow again through an annular gap, or they enter the combustion chamber directly via the sharp-edged (e.g. 90° angled edge 17) opening of the sleeve 2.

The individual jets of fuel meet the oxidant spray cone in the combustion chamber and partially penetrate same. Experimental series, which were first carried out with individual elements and then with multi-element injection heads, showed that this manner of preparation and mixing leads to a highly stable combustion with high efficiency in the case of the hypergolic propellants discussed herein.

For safety reasons, hypergolic propellants must be hermetically separated from one another before reaching the predetermined reaction zone. The central body 5 and the sleeve 2 are therefore connected to one another in a liquid-tight and air-tight manner via the weld seam 9. The sleeve 2 is connected to both the base plate 19 separating the oxidant and the propellant via the weld seam 8 and to the combustion chamber-side front plate 20 via the weld seam 11 in a liquid-tight and gas-tight manner. The weld seam 10 connects the throttle 3 to the central body 5.

While a specific embodiment of the invention has been shown and described in detail to illustrate the application of the principles of the invention, it will be understood that the invention may be embodied otherwise without departing from such principles.

What is claimed is:

1. An injection element within a rocket combustion chamber with a combustion chamber pressure of 3 to 30 bar and for operation with two hypergolically reacting propellants, wherein nitrogen tetroxide, mixtures of nitrogen tetroxide and dinitrogen tetroxide (MON, Mixed Oxygen Nitride), or nitric acid is preferably used as the oxidant, and hydrazine and/or its derivatives are preferably used as the fuel, the injection element comprising:

an extensively rotationally symmetrical central body for an oxidant, said central body defining an oxidant flow channel having a twisting insert, a cross section contraction and an outlet with an oxidant flow channel opening edge, said oxidant flow channel having a circular cylindrical internal contour at least in an area of said outlet opening;

a sleeve concentrically surrounding said central body, said sleeve defining an annular flow channel for an fuel, said sleeve having lateral inlet openings and an outlet opening with a circular cylindrical inner contour with a fuel flow channel outlet opening edge, said oxidant flow channel outlet opening edge and said fuel flow channel outlet opening edge each being located in a plane of an upstream surface of the rocket combustion chamber;

a flow divider for dividing fuel flow into 5 to 20 individual flow portions of equal flow rate and cross section and at equally spaced locations, said flow divider being arranged in said fuel flow channel between said sleeve and said central body, said oxidant flow channel and said fuel flow channel having cross sections dimensioned to allow velocities of flow of said oxidant and said fuel between 5 m/sec and 20 m/sec at a point of entry into said combustion chamber;

said flow divider extends radially from said central body to a location adjacent to said internal contour of said sleeve, said flow divider having between 5 and 20 radially and axially oriented slots, which are open toward said sleeve and have a constant width over a given radial depth and have an axial length, wherein a ratio of said radial depth to said width is from 1 to 5.

2. An injection element according to claim 1, wherein:

a radial gap is present between said internal contour of said sleeve and an external circumference of said flow divider, said radial gap being at most 10 µm, which is constant over a circumference and over an axial length of said flow divider.

3. An injection element according to claim 1, wherein:

a downstream end of said flow divider is located at an axially spaced location from said opening edge of said sleeve.

4. An injection element according to claim 1, wherein:

a downstream end of said flow divider is located at an axially spaced location from said opening edge of said sleeve.

5. An injection element according to claim 1, wherein:

said oxidant flow channel defines oxidant exiting means between said twisting insert to said opening edge for injecting said oxidant in the form of a plurality of individual drops with a solid or hollow conical distribution, said distribution having an opening angle which is at least 20° and at most 90°.

6. An injection element according to claim 1, wherein said oxidant flow channel forms substantially a 90° angle with said upstream surface of said rocket combustion chamber.

7. An injection element within a rocket combustion chamber with a combustion chamber pressure of 3 to 30 bar and for operation with two hypergolically reacting propellants, the injection element comprising:

an extensively rotationally symmetrical central body for said oxidant, said central body defining an oxidant flow channel having a twisting insert, a cross section contraction and an outlet with a oxidant flow channel opening edge, said oxidant flow channel having a circular cylindrical internal contour at least in an area of said outlet opening;

a sleeve concentrically surrounding said central body, said sleeve defining an annular flow channel for a fuel, said sleeve having lateral inlet openings and an outlet opening with a circular cylindrical inner contour with a fuel flow channel outlet opening edge, said oxidant flow channel outlet opening edge and said fuel flow channel outlet opening edge each being located in a plane of an upstream surface of the rocket combustion chamber;

flow divider means for dividing fuel flow into 5 to 20 individual flow portions of equal flow rate and cross section and at equally spaced locations, said flow divider means being arranged in said fuel flow channel between said sleeve and said central body, said oxidant flow channel and said fuel flow channel having cross sections dimensioned to allow velocities of flow of said oxidant and said fuel between 5 m/sec and 20 m/sec at a point of entry into said combustion chamber;

a radial gap present between said internal contour of said sleeve and an external circumference of said flow divider, said radial gap being at most 10 µm, which is constant over a circumference and over an axial length of said flow divider.

8. An injection element according to claim 7, wherein:

a downstream end of said flow divider is located at an axially spaced location from said opening edge of said sleeve.

9. An injection element according to claim 7, wherein said oxidant flow channel forms substantially a 90° angle with said upstream surface of said rocket combustion chamber.

10. An injection element within a rocket combustion chamber with a combustion chamber pressure of 3 to 30 bar and for operation with two hypergolically reacting propellants, wherein nitrogen tetroxide, mixtures of nitrogen tetroxide and dinitrogen tetroxide (MON, Mixed Oxygen Nitride), or nitric acid is used as the oxidant, and hydrazine and/or its derivatives are used as the fuel, the injection element comprising:

an extensively rotationally symmetrical central body for said oxidant, said central body defining an oxidant flow channel having a twisting insert, a cross section contraction and an outlet with a oxidant flow channel opening edge, said oxidant flow channel having a circular cylindrical internal contour at least in an area of said outlet opening;

a sleeve concentrically surrounding said central body, said sleeve defining an annular flow channel for said fuel, said sleeve having lateral inlet openings and an outlet opening with a circular cylindrical inner contour with a fuel flow channel outlet opening edge, said oxidant flow channel outlet opening edge and said fuel flow channel outlet opening edge each being located in a plane of an upstream surface of the rocket combustion chamber;

flow divider means for dividing fuel flow into 5 to 20 individual flow portions, each flow portion extending separate from adjacent said flow portions to said fuel flow channel outlet opening edge, each of said flow portions having an equal flow rate, an equal cross section and being provided at equally spaced locations, said flow divider means being arranged in said fuel flow channel between said sleeve and said central body, said oxidant flow channel and said fuel flow channel having cross sections dimensioned to allow velocities of flow of said oxidant and said fuel between 5 m/sec and 20 m/sec at a point of entry into said combustion chamber;

said flow divider extends radially from said central body to a location adjacent to said internal contour of said sleeve, said flow divider having between 5 and 20 radially and axially oriented slots, which are open toward said sleeve and have a constant width over a given radial depth and have an axial length, wherein a ratio of said radial depth to said width is from 1 to 5.

11. An injection element according to claim 10, wherein said oxidant flow channel forms substantially a 90° angle with said upstream surface of said rocket combustion chamber.

* * * * *